Patented July 15, 1924.

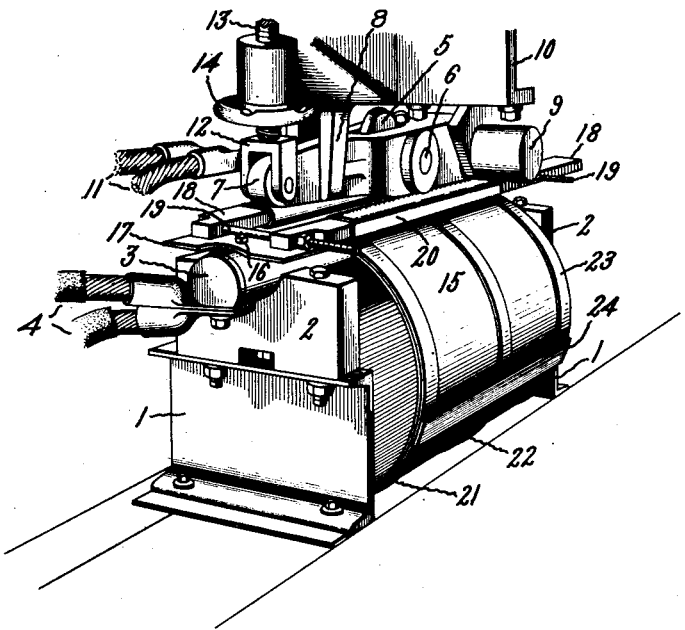

1,501,872

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

APPARATUS FOR RESISTANCE LINE WELDING.

Application filed August 10, 1923. Serial No. 656,731.

*To all whom it may concern:*

Be it known that I, HARRY W. TOBEY, a citizen of the United States, residing at Pittsfield, in the county of Berkshire, State of Massachusetts, have invented certain new and useful Improvements in Apparatus for Resistance Line Welding, of which the following is a specification.

My invention relates to welding apparatus of the type wherein means are provided for causing relative movement between the parts to be welded and one or both of a pair of electrodes arranged to conduct welding current across the joint between these parts, and has for its object the provision of means for supporting the parts to be welded in a manner to facilitate good contact between them at all points of the joint.

In welding together metallic parts, such as the edges forming the longitudinal seam of a drum for example, it frequently happens that the welded joint is faulty due to the fact that the edges to be welded do not lie flat when the work is rigidly clamped in place. It is in some cases possible to apply sufficient pressure through the welding electrode to iron out these irregularities but the pressure required to do this is greatly in excess of that necessary to weld the bulk of the work properly and is further objectionable in that it causes rapid deformation and deterioration of the welding surface of the electrode. In accordance with my invention this difficulty is avoided by clamping the work in such a way as to permit it to move or rock on its supports. Under these conditions the pressure required to produce good contact at all points of the joint is substantially reduced, the pressure necessary for successful welding at all points in the line of the weld is obtained and the useful life of the electrode is prolonged.

My invention will be better understood on reference to the following description when considered in connection with the accompanying drawing and its scope will be pointed out in the appended claims.

Referring now to the drawing; Fig. 1 shows the main details of a welding machine in which my invention has been embodied, Fig. 2 shows the manner in which the work is supported on a stationary mandrel forming one of the electrodes; and Fig. 3 shows a support adapted to permit the use of rotatable electrodes on opposite surfaces of the work.

Fig. 1 shows a welding machine comprising at each of its ends a supporting channel member 1 upon which is mounted a block 2 having in its upper surface a semi-circular groove for receiving a stationary electrode or mandrel 3 to which welding current may be conducted by means of leads 4 and which is arranged to support the metallic parts to be welded together. Arranged to cooperate with the stationary electrode 3 is a rotatable electrode 5 conductively associated with the leads 11 and mounted on a shaft 6 having its bearings in an arm 7 which is guided in its upward and downward movement by guide members 8 and is arranged to rotate about the shaft 9 supported in bearings attached to the supporting member 10. Upon the free end of the arm 7 is pivoted a member 12 arranged to cooperate with the threaded member 13 and handwheel 14 for compressing the parts to be welded together between the electrodes 3 and 5. The work illustrated is a drum 15 the overlapping edges of which are to be welded together. A cradle for supporting the work in suitable relation with the electrodes 3 and 5 is attached to the electrode or mandrel 3 by means of bolt 16 and transverse member 17 in such a way as to permit it to rock to and fro in a direction transverse to the axis of the mandrel. This cradle comprises the transverse plates or members 17 upon which are supported at each side of the electrode 3 longitudinal members 18 arranged to be pulled toward each other by means of bolts 19 and surrounded by sleeves 20 to which are attached bands 21, 22 and 23 for the purpose of forcing the edges of the work 15 into proper relation with the electrodes 3 and 5. Suitable members 24 are provided for spacing the bands 21, 22 and 23 in parallel relationship.

Figure 2 shows a work support comprising U-shaped members 25 attached to the mandrel 3 by means of bolts 16 in such a way as to permit them to rock with the work as previously explained and provided with bifurcated ends 26 and thumb screws 27 for clamping the work in suitable relation with electrodes 3 and 5. A transformer 28 comprising a primary winding 29 connected to any suitable source of current and a secondary winding 30 having its terminals connected to the electrodes 3 and 5 is diagrammatically shown.

Fig. 3 illustrates one way of supporting the work when electrodes rotated in contact with opposite surfaces of the seam are utilized in making the weld. In this case the mandrel 3, which in the modifications shown by Figs. 1 and 2 functioned both as an electrode and a support for the work, is replaced by supports 31, the rotatable electrode 32 being utilized to complete the circuit by which welding current is conducted to the seam.

In each of the arrangements shown in Figs. 1, 2 and 3 the work is arranged to rock about an axis substantially in the line of the weld so that irregularities in the work which result in rocking or tilting the work do not require lateral movement of the point of welding of the work with respect to the electrodes. The electrodes are thereby enabled to function in the manner heretofore set forth to accommodate irregularities in the work without lateral strains tending to distort the electrodes or cause them to tend to deviate from the desired line of welding.

While I have illustrated the work as a drum, the overlapping edges of which are to be welded, it is apparent that my invention is also applicable to the welding of overlapping, flat plates, but where flat sheets of considerable width are involved, the desired effect is, of course, not so readily produced, or present to so great an extent.

I have not illustrated means whereby relative movement may be produced between the work and the rotatable disk electrode, or electrodes, since such means are well-known in the art. It is apparent to those skilled in the art that the work and mandrel shown in Figs. 1 and 2 may be stationary and the electrode mounted on a supporting structure arranged to be moved over the work. It is also apparent that the rotatable disk electrode may be supported from a stationary frame and the work and mandrel mounted to move under the stationary electrode. Similarly, with the arrangement shown in Fig. 3 wherein the welding current is conducted through the work by means of a pair of rotatable electrodes pressed against the work it is apparent that the relative movement along the line of the weld may be produced by moving either the electrodes or the work, or both.

It is obvious to those skilled in the art that many changes and modifications may be made in the arrangement shown without departing from the spirit of my invention and I, therefore, aim in the appended claims to cover all such modifications and variations as fall within the true spirit and scope of my invention.

What I claim as new and desire to secure by Letters Patent of the United States, is:

1. A welding apparatus of the type wherein means are provided for producing relative movement between the work and an electrode pressed against the work and forming a part of the circuit through which welding current is conducted across the joint between the parts to be welded together, characterized by the fact that means for holding the work are arranged to rock upon a support whereby the pressure required to bring the parts to be welded into good contact during the welding operation is reduced.

2. A welding apparatus of the type wherein means are provided for producing relative movement between the work and a rotatable electrode pressed against the work and forming a part of the circuit through which welding current is conducted across the joint between the parts to be welded together, comprising a support, work holding means arranged to rock upon said support, and means for maintaining the seam to be welded in the path of said relative movement during the welding operation.

3. A welding apparatus of the type wherein means are provided for producing relative movement between the work and a rotatable electrode pressed against the work and forming a part of the circuit through which welding current is conducted across the joint between the parts to be welded together, comprising work-holding means mounted to rock about an axis in the line of the weld for the purpose described.

4. A welding apparatus of the type wherein means are provided for producing relative movement between the work and an electrode pressed against the work and forming a part of the circuit through which welding current is conducted across the joint between the parts to be welded together, comprising a stationary electrode, work holding means arranged to rock upon said stationary electrode, and means for maintaining the seam to be welded in the path of said relative movement during the welding operation.

5. A welding apparatus of the type wherein means are provided for producing relative movement between the work and an electrode pressed against the work and forming a part of the circuit through which welding current is conducted across the joint between the parts to be welded together, comprising a support, work holding means including a U-shaped member arranged to rock upon said support and having its ends adapted to clamp together the parts to be welded, and a mechanical connection between said support and said U-shaped member for maintaining the seam to be welded in the path of said relative movement during the welding operation.

In witness whereof I have hereunto set my hand this 4th day of August, 1923.

HARRY W. TOBEY.